April 12, 1949.                    H. W. YOUNG                          2,467,360
                        CELESTIAL NAVIGATIONAL INSTRUMENT
Filed March 26, 1948                                              4 Sheets-Sheet 1

HENRY W. YOUNG
INVENTOR

BY
ATTORNEY

April 12, 1949.  H. W. YOUNG  2,467,360
CELESTIAL NAVIGATIONAL INSTRUMENT
Filed March 26, 1948  4 Sheets-Sheet 2

HENRY W. YOUNG
INVENTOR

BY
ATTORNEY

April 12, 1949.  H. W. YOUNG  2,467,360
CELESTIAL NAVIGATIONAL INSTRUMENT
Filed March 26, 1948  4 Sheets-Sheet 3

HENRY W. YOUNG
INVENTOR

April 12, 1949.    H. W. YOUNG    2,467,360
CELESTIAL NAVIGATIONAL INSTRUMENT
Filed March 26, 1948    4 Sheets-Sheet 4

HENRY W. YOUNG
INVENTOR

BY
ATTORNEY

Patented Apr. 12, 1949

2,467,360

UNITED STATES PATENT OFFICE 2,467,360

CELESTIAL NAVIGATIONAL INSTRUMENT

Henry Wilson Young, Sao Paulo, Brazil

Application March 26, 1948, Serial No. 17,215

17 Claims. (Cl. 235—61)

This invention relates to an instrument for use in the instruction of and in the practice of the art of celestial navigation.

It is a principal object of my invention to provide a simply constructed and easily useable instrument of general use to the celestial navigator and student of celestial navigation, by means of which many of the phases of celestial navigation may be reduced to mechanical manipulation of a computer, and by means of which many of the basic concepts upon which the art of celestial navigation is based may be taught. Some of these uses of the celestial navigation instrument of this invention are the determination of the local hour angle of any celestial body, finding the correction to be applied to the observed altitude of Polaris to determine the latitude of the observer, finding the time of transit of Aries or any celestial body over the meridian of the observer, converting Zone Time to Local Civil Time or Local Sidereal Time, converting angles of arc to time, converting Local Civil Time to Greenwich Civil Time, and vice versa.

Another object of my invention is to provide in conjunction with an instrument having the preceding characteristics an instrument which may be used, in conjunction with suitable templates, as a star finder or as an aid in star identification.

In order to accomplish the foregoing objects, I have provided an instrument comprising a base disc, a measuring disc, a meridian disc and a clock disc, the several discs all being rotatable about a central pivot, and each of the discs is provided with suitable celestial body representations, graduated scales and/or index lines by which the required orientation of the several discs relative to one another may be accomplished so that the solution to the value being sought may be ascertained, or so that the instrument may be used as a star finder or as an aid to star identification, as the case may be.

Another important object of my invention is the provision in conjunction with such an instrument of a cursor arm affixed to one of the discs so that the disc to which the cursor arm is attached may be easily rotated relative to the other discs, the cursor arm also being arranged relative to the remaining discs and the discs being arranged relative to one another so that by selectively applying pressure to the cursor arm and/or discs, relative rotation between any two selected discs may be prevented, at the same time permitting rotation between the two selected discs and the remaining discs of the instrument.

In order that the detailed nature of my invention may be understood, reference is made to the accompanying drawings, which disclose the preferred embodiment of an instrument incorporating my invention for use in the north terrestrial hemisphere, wherein, Fig. 1 is a plan view of the instrument showing the four discs and cursor arm.

Figure 1:
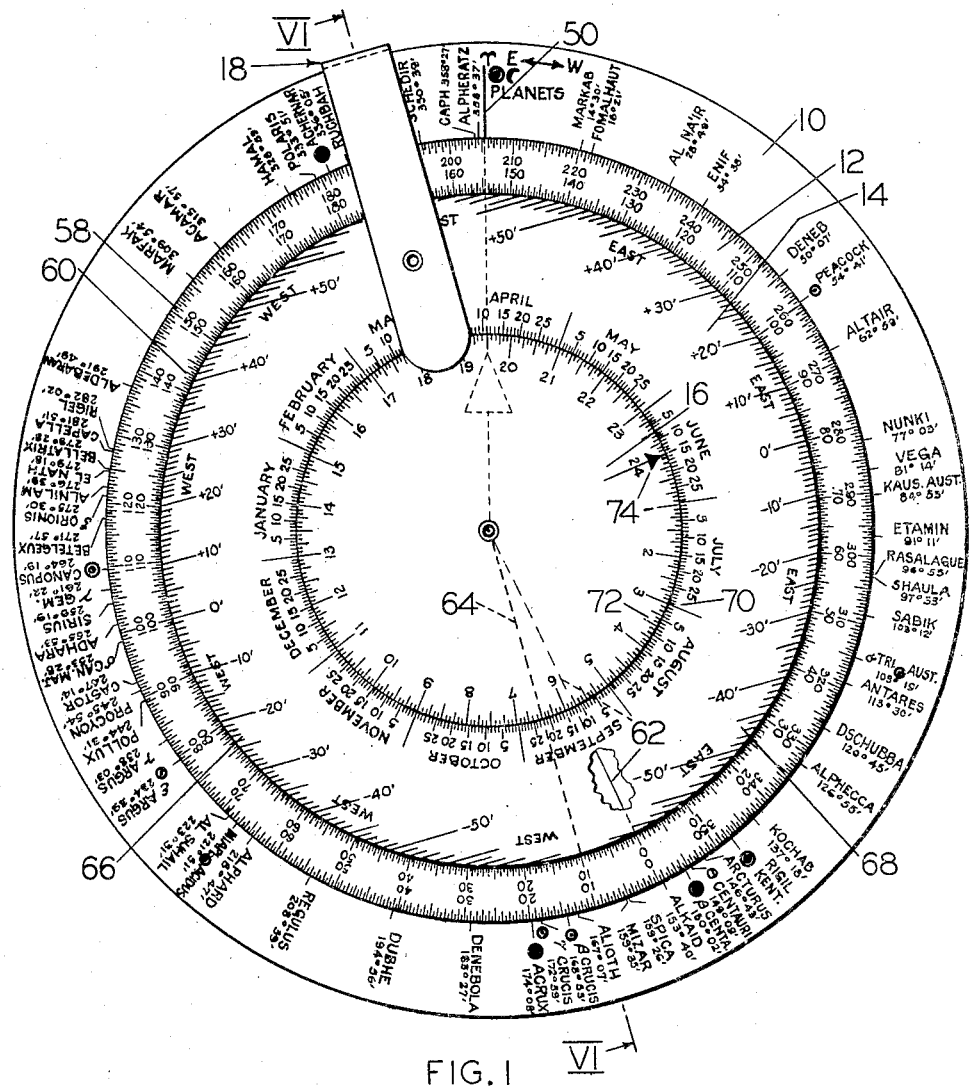

Referring now to Fig. 1, it will be seen that the instrument comprises an opaque base disc 10, a transparent measuring disc 12, a transparent meridian disc 14, a transparent clock disc 16 and a transparent cursor arm designated generally by 18.

Figure 2:
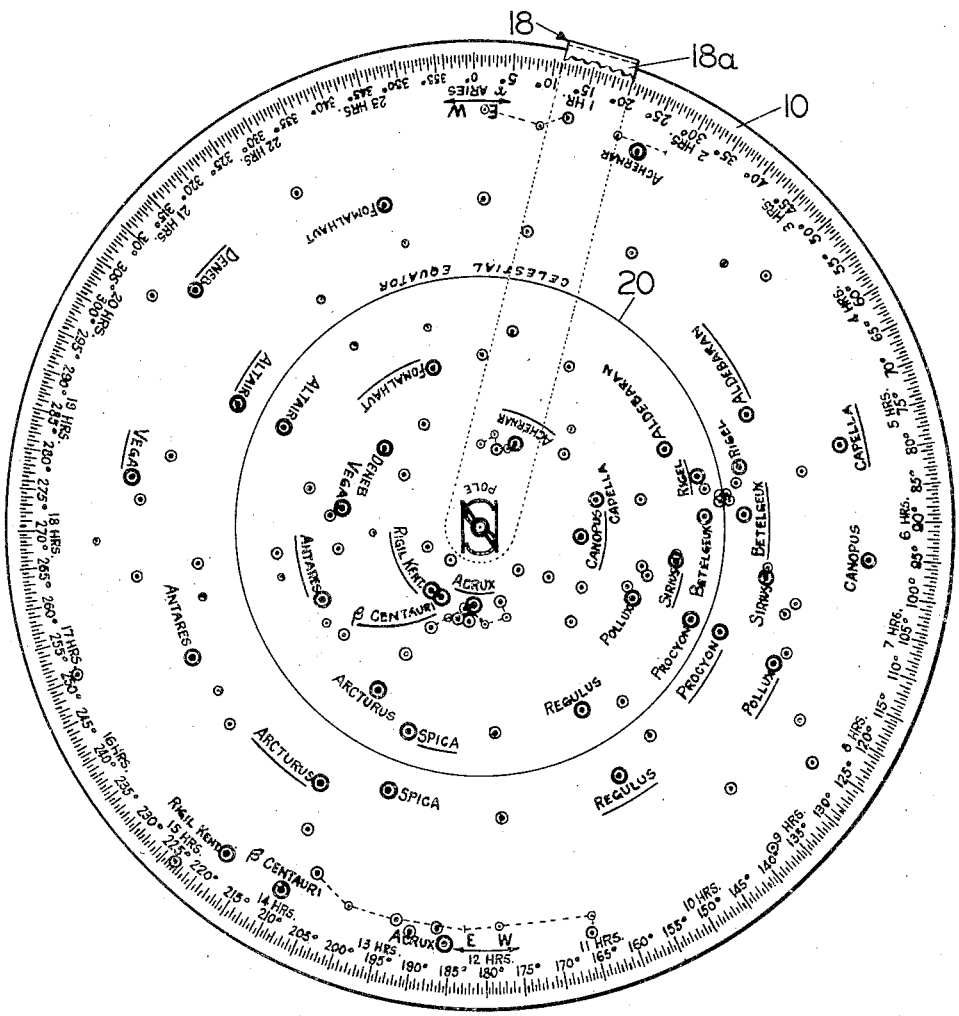
Fig. 2 is plan view of the bottom side of the base disc and showing a fragment of the bottom side of the cursor arm.

On the under side of the base disc 10, as seen in Fig. 2, is a chart of the positions of the navigational stars, the positions of the stars indicated in black constituting a chart of star positions on the celestial sphere as seen by an observer located on the north terrestrial hemisphere, and the positions of the stars indicated in red constituting a chart of sub-stellar star positions for use by an observer in the south terrestrial hemisphere. The north celestial and south terrestrial poles are located in the center of the disc, as indicated, and in the case where the user of the instrument is in the north terrestrial hemisphere, the stars printed in black and within the circle described by the celestial equator 20 are in the north celestial hemisphere and the stars in black outside the circle in question are in the south celestial hemisphere. In the case where the user of the instrument is in the south terrestrial hemisphere, the sub-stellar positions of the stars indicated in red within the circle described by the celestial equator 20 are in the south terrestrial hemisphere and the sub-stellar positions of the stars indicated in red outside the celestial equator 20 are in the north terrestrial hemisphere. Consequently, each star appears twice on the bottom of the base disc 10, once in red and once in black, and on opposite sides of the celestial equator 20 and at equal distances from the celestial equator, the magnitude of the distances being proportional to the declination of the stars.

The periphery of the bottom of the base disc 10 is graduated from zero to 360 degrees. In addition, just inside the graduations in question are labelled the hours from zero through 24. The meridian of Aries (T) is located on the zero degree and zero hour graduation. The location of all of the stars on the bottom of the base disc 10 relative to the degree and hour graduations and relative to the Aries meridian is such that the right ascension of any star may be ascertained.

In the actual construction of the instrument, those stars whose names are underlined in Fig. 2 appear in red, as indicated above. Because of mechanical limitations, in Fig. 2 the names of all the stars shown do not appear, but it will be appreciated that in the actual construction of the instrument they should.

Figure 7:
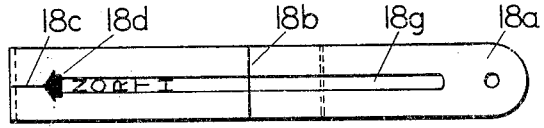
Fig. 7 is a plan view of the bottom side of the cursor arm.

Also shown in Figs. 2 and 7 is the bottom 18a of the cursor arm 18 having a line 18b thereon which lies above the celestial equator circle 20. The outer end of the bottom 18a carries the index 18c and arrow 18d pointing thereto, as well as the designation "North."

Figure 3:
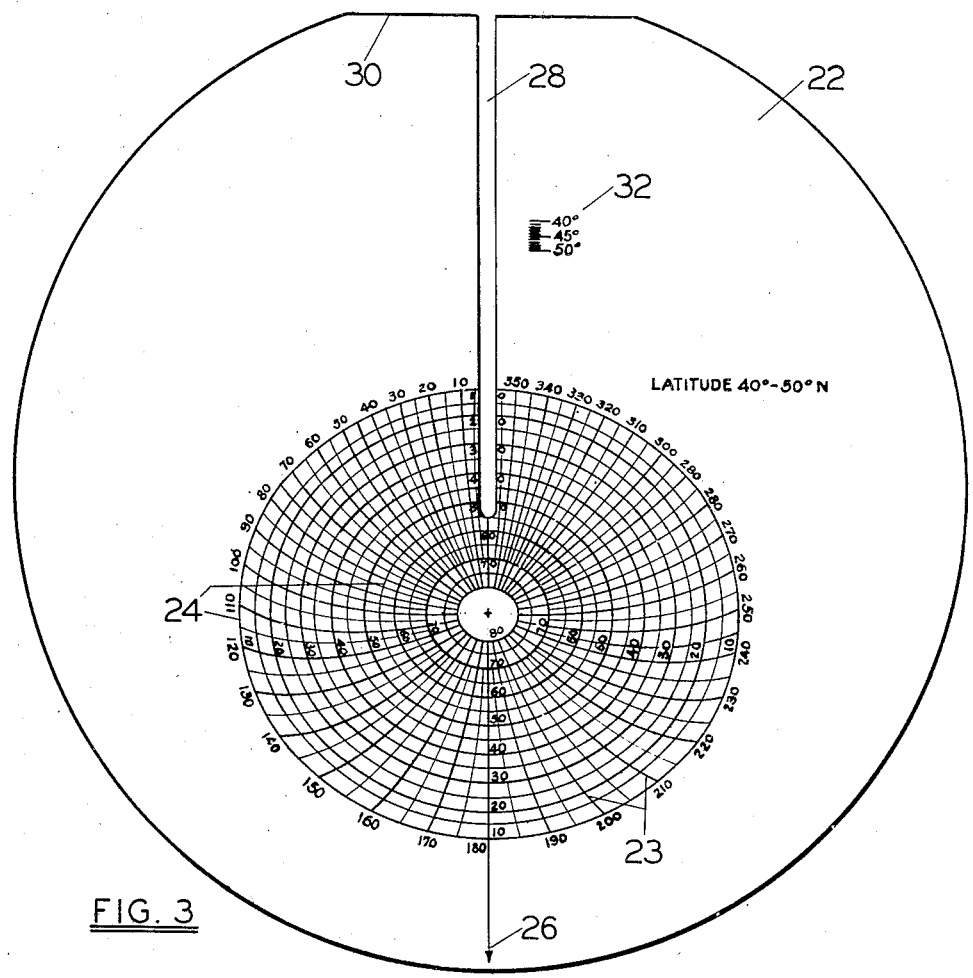
Fig. 3 is a plan view of a typical one of the templates which may be used with my instrument when the instrument is used as an aid in star finding or star identification.

For use in conjunction with the under side of the base disc 10 when the instrument is used as an aid in star finding or star identification are a set of templates in black for use in the northern terrestrial hemisphere, and a set of templates in red for use in the southern terrestrial hemisphere. An illustrative one of these templates is shown in Fig. 3 and comprises a circular transparent member 22 having printed thereon grid lines including the generally radial lines of equal azimuth 23 and generally circular lines of equal altitude 24. A suitable index 26 is located in the center of the grid lines, and a slot 28 is cut from the template, the slot in the illustrated case extending from approximately the fifty-five degree altitude circle 24 outwardly to the periphery of the template and along the 360° azimuth line 23. The otherwise circular periphery of template 22 is flattened at 30 for a short distance each side of the outer end of slot 28. It will be noted that the template 22 is labelled for use by an observer in north latitudes from 40 to 50 degrees, and near the slot 28 are a set of graduations 32 from 40 to 50 degrees.

Figure 4:
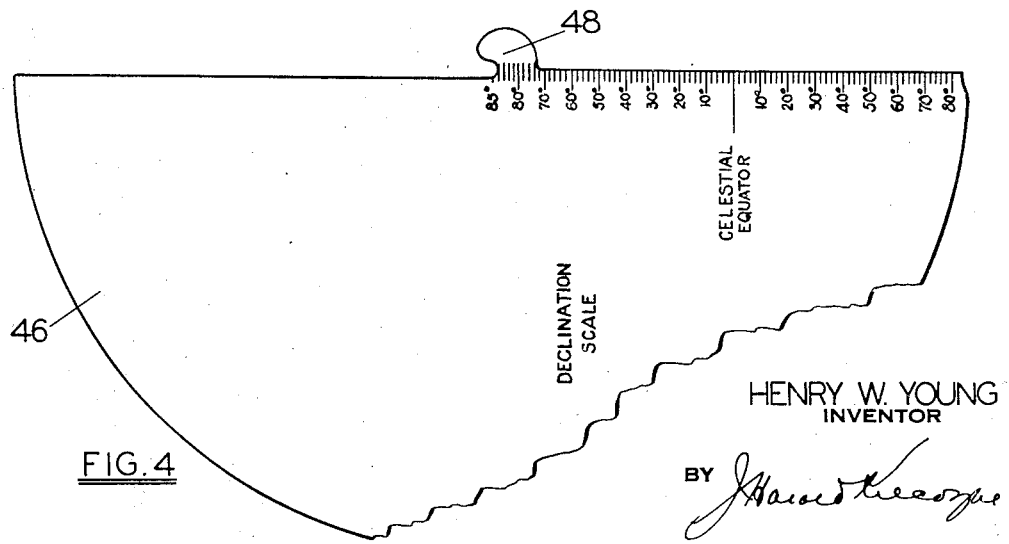
Fig. 4 is a plan view of a declination scale which may be used for plotting the positions of additional stars and of the planets on the bottom side of the base disc.

A declination scale shown in Fig. 4 is also provided for use in plotting the positions of planets or additional stars on the bottom of the base disc 10. This scale includes the transparent base 46 in the form of a half circle of a radius equal to the radius of the base disc, and a hook-shaped projection 48 together with a scale in degrees from 85 to zero to 80, with the zero graduation being labelled "celestial equator."

Figure 5:
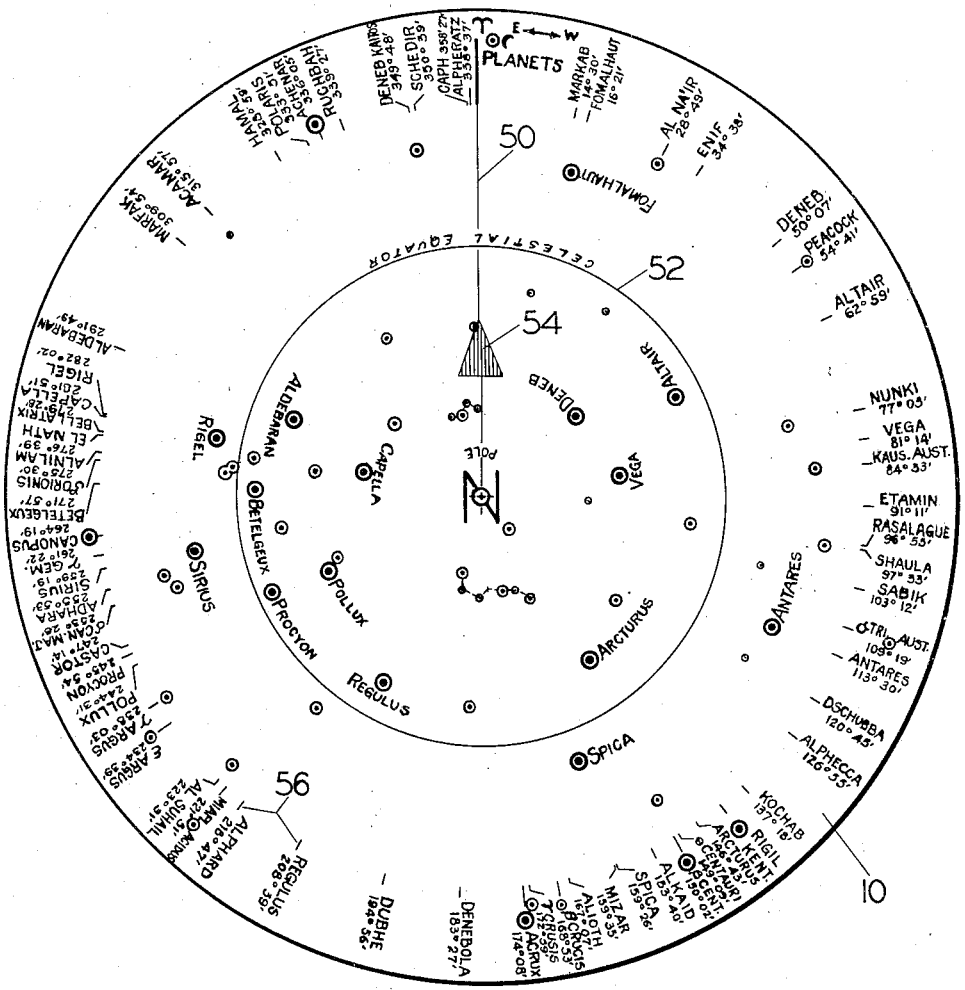
Fig. 5 is a plan view of the top side of the base disc.

Reference is now made to Fig. 5 which shows the top side of the base disc 10 upon which are printed the substellar positions of the navigational stars of the northern celestial hemisphere. A line 50 which represents the meridian of Aries is drawn from the center of the disc to near the periphery thereof.

Located on the Aries meridian 50 is the pointer 54, and spaced around the top of the base disc are a series of short radially extending graduations 56 which are circumferentially spaced according to the sidereal hour angle (SHA) of the stars shown on the disc. Each of the graduations 56 has the name of the proper star associated therewith, and the sidereal hour angle of the star is printed adjacent the name. The names and sidereal hour angles of the stars of the south celestial hemisphere preferably appear in red, and the graduations in question are displaced from the center of the base disc the required distance to cooperate with the graduations on the measuring disc 12. The Aries meridian line 50 and arrow 54 preferably are printed in a distinctive color such as red, except that the outer end of the line 50 lying outside the measuring disc 12 may be black. The celestial equator 52 is also drawn on this side, and the stars are properly located relative to the celestial equator 52 in declination and relative to the Aries meridian 50 in right ascension. The celestial equator 52 is drawn from the center of the disc on the same radius as the celestial equator 20 on the bottom side thereof, and the outer end of the Aries meridian 50 on the top side of the base disc is directly above the zero degree and zero hour graduations on the bottom side of the disc.

The measuring disc 12 has outer and inner scales 58 and 60, the outer scale being graduated in half degrees from zero clockwise through 360, and may be used to measure Greenwich Hour Angle (GHA) or Local Hour Angle (LHA), as the case requires, while the inner scale is graduated in half degrees from zero to 180 in both directions, and may be used to measure longitude or Local Hour Angle from zero to 180 degrees east or west. One half the inner scale is designated "East," and the other half is designated "West." On the measuring disc is placed a radial line 62, of a different color from any other line, e. g., green, which line may be used to represent the meridian of the Greenwich.

The meridian disc 14 has a radially extending line 64, of a different color from any of the other radial lines, e. g., black, which line may be used to represent the observer's meridian, particularly when the instrument is set up on Local time or from data obtained from the Air Almanac or equivalent source. When the instrument is set up on Mean time, the line 64 may represent the mid-meridian of a time zone. It should be particularly noted that the observer's meridian line 64 is displaced 180 degrees from the cursor arm 18. The meridian disc 14 carries on its periphery two sets of graduations 66 and 68 each ranging in value from minus 59 minutes to plus 59 minutes, the two sets of graduations being on opposite sides of the radial line 64. The scales 66 and 68 are used for making corrections to the observed altitude of Polaris to obtain the latitude of the observer.

Inwardly of the scales 66 and 68 the meridian disc 14 carries a calendar scale 70 extending throughout 360 degrees and having twelve major divisions for the months of the year, each of these major divisions in turn being subdivided according to the number of days in each month. The length of each major subdivision varies according to the number of days in the month.

The clockdisc 16 is peripherally graduated at 72 in hours from zero through 24 in intervals of five minutes, and has an arrow 74 at zero mark. The graduations 72 are arranged to cooperate with the calendar scale graduations 70.

Figure 6:
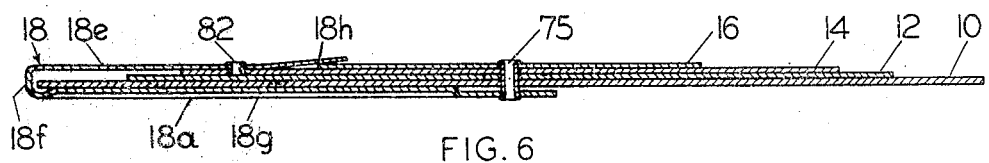
Fig. 6 is a cross sectional view taken along the lines VI—VI of Fig. 1.

Reference is now made to Fig. 6 which shows the structural attachment of the several parts of my instrument. It will be seen that the base disc 10, measuring disc 12, meridian disc 14 and clock disc 16 are all concentric and free to rotate individually or together about the pin 75. The cursor arm 18 has two generally parallel sides 18a and 18e connected by the integral curved portion 18f. The lower arm 18a has its inner end pivoted upon the pin 75, while the upper arm 18e is pinned intermediate its ends by pin 82 to the meridian disc 14. The inner end 18h of the upper arm 18e rests upon the upper surface of the clock disc 16. Consequently, each of the discs is free to rotate indefinitely in either direction relative to the pin 75 and relative to the other discs, but the cursor arm 18 is fixed to the meridian disc 14 for rotation therewith. The inner end 18h of the upper arm 18e is preferably designed to exert sufficient force upon the clock disc to retain the disc in fixed position relative to the meridian disc 14 when the disc 14 is rotated, so that the discs 14 and 16 may be freely rotated relative to the other two discs. Also, when the meridian disc 14 is held by cursor arm 18, the measuring disc may be freely rotated singly or together with the base disc relative to the two discs 14 and 16 so held. By applying presure by the thumb and index finger to the lower arm 18a and base disc 10 at opposite points, relative motion between the base disc 10 and meridian disc 14 may be prevented, in which case the measuring disc 12 is still free to rotate relative to the other discs, but such rotation may be prevented by applying pressure to the instrument at opposite points along the axis of pin 82. Relative rotation between the measuring disc 12 and base disc 10 may be prevented by applying pressure by the thumb against the outer edge of the measuring disc and by the index finger against the lower surface of the base disc, in which case the other two discs may be rotated singly or together.

It will therefore be appreciated that the cursor arm 18 provides a simple but effective means whereby the discs may be held relative to one another in various combinations, the remaining discs being free to rotate, thus greatly enhancing the value of the instrument, as will become more apparent hereinafter as the description of the use of the instrument proceeds.

In Figs. 6 and 7 it will be seen that the upper surface of the lower arm 18a of the cursor arm 18 has a longitudinally extending rib 18g.

The use of the instrument of this invention for star finding, star identification, Polaris corrections to obtain the observer's latitude and for Local Hour Angle measurements will now be explained. First, the alternative basic adjustments which may be used will be explained.

A. *Using Zone time*

1. The arrow 74 of the clock disc 16 is set adjacent the calendar scale 70 according to the date of use.

2. The meridian disc 14 and clock disc 16 are then rotated by means of the cursor arm 18 so that the red arrow 54 on the upper surface of the base disc 10 is underneath value on the clock scale 72 for the hour and minute of the observation.

These two adjustments orient the observer's meridian line 64 on the disc 14 and the cursor arm 18 of the instrument relative to the base disc 10 for the mid-meridian of the time zone of the observer for the day, hour and minute of the observation. While this simple method is very rapid, inasmuch as the instrument is oriented for the mid-meridian of the time zone of the observer, the basic setting may contain as much as 7½ degrees of angular error. For this reason, this setting should be used only for general star finding, or when the observer knows his position to be on or near the mid-meridian of his time zone. Because of the possibility of error in the foregoing method of basic orientation of the instrument, when more accurate results are desired the following method should be used.

B. *Using Local time*

Steps 1 and 2 immediately above are performed.

3. By means of the cursor arm 18, the meridian disc 14 is held relative to the base disc to preserve the previously accomplished orientation, and the measuring disc 12 is rotated so that the observer's meridian line 64 on the meridian disc 14 is opposite the value on the inner scale 60 of the measuring disc 12 equal to the longitude of the mid-meridian of the time zone of the observer, care being exercised to select the east or west portion of the scale according to whether the observer is at an east or west longitude.

4. Holding the measuring disc 12 and base disc 10 in their preset relative positions, the meridian disc 14 is rotated by means of the cursor arm 18 so that the observer's meridian line 64 on the meridian disc 14 coincides with the value on the measuring disc scale 60 equal to the longitude of the observer.

This second method of basically orienting the observer's meridian line 64 and cursor arm 18 will be accurate within one degree, which error is caused by not adjusting the instrument for the approximate one-degree-per-day gain in Greenwich Hour Angle of Aries.

C. *Using the Air Almanac*

1. Convert the local time of the observer to Greenwich Civil time (GCT), and enter the Air Almanac or equivalent source for the date and time of observation to ascertain the Greenwich Hour Angle of Aries (GHAT).

2. Rotate the measuring disc 12 so that the graduation on the outer scale 58 of the measuring disc of the value of the GHAT is adjacent the Aries meridian 50 on the base disc.

3. By means of the cursor arm 18, rotate the meridian disc 14 until the observer's meridian line 64 on the meridian disc 14 indicates the longitude of the observer upon the inner scale 60 on the measuring disc 12, at the same time preventing relative rotation between the base disc 10 and measuring disc 12.

The accuracy of this method is ordinarily within a quarter of a degree.

It will be appreciated that each of the above three methods orients the observer's meridian line 64 on the meridian disc 14 and the cursor arm 18 relative to the Aries meridian 50 and stars on the base disc according to the Local Hour Angle of Aries.

In the first illustration given above where the desired setting is only approximated, the observer's meridian is set relative to the meridian of Aries by introducing the factors of date and zone time; in the second case where a more accurate setting is desired, the observer's meridian is set relative to the meridian of Aries by introducing the factors of date and zone time, and the setting is then rendered more accurate by determining the difference in longitude between the observer's position and the mid-meridian of the observer's time zone, and modifying the position of the meridian line 64 accordingly. In the third case, the Greenwich meridian line 62 is oriented relative to the Aries meridian line 50 for the Greenwich Hour Angle of Aries, and then the observer's meridian line 64 is oriented relative to the Greenwich meridian line 62 for the longitude of the observer.

The instrument is shown in Fig. 1 with the basic adjustments made according to B above by an observer at 65°30' west longitude upon June 15 at 1930 zone time. The obtained LHAT which is the angular distance from the Aries meridian 50 on the base disc 10 counterclockwise to the observer's meridian 64 on the meridian disc 14 is 189°45'. To easily secure this distance, the observer need only press the cursor arm 18 against the base disc 10 and rotate the measuring disc 12 until the zero graduation on the outer scale 58 on the measuring disc is opposite the observer's meridian 64, at which time the 189°45' graduation on the same scale will be adjacent the Aries meridian 50 on the base disc 10.

Employing the method A above, the obtained LHAT is 195°30', and in method C is 190°45'. Actual mathematical calculation gives 190°53'.

In the use of the instrument for star identification, i. e., the azimuth and altitude of the star are known but the name of the star is not, the basic adjustment B or C may be employed. The proper template 22 for the latitude and hemisphere of the observer is applied to the bottom of the instrument by placing the central pin 75 in the slot 28 in the template and sliding the template parallel to the cursor arm 18 so that the rib 18g on the upper side of the lower cursor arm 18a lies with the slot 28. The template 22 is positioned by this sliding until the latitude of the observer is indicated by the latitude scale 32 relative to the celestial equator mark 18b on the cursor arm 18a and relative to the celestial equator circle 20 on the under side of the base disc 10. Those stars on the bottom of the base disc 10 lying within the outermost altitude circle 24 on the template 22 are the ones which will be visible to the observer, and the index 26 at the exact center of the grid circles on the template 22 represents the exact substellar position of the observer. Knowing the azimuth and altitude of the star, the name of the star in question may be ascertained by finding what star on the bottom of the base disc 10 is positioned relative to the azimuth line 23 corresponding to the known azimuth of the star being identified and relative to the altitude curves 24 on the template 22 corresponding to the known altitude of the star being identified.

Also, any particular star may be located on the celestial sphere by the use of the template 22. Having adjusted the instrument as last explained, the azimuth and altitude of any star which it is desired to locate on the celestial sphere may be determined by inspection of the instrument, and having ascertained the aizmuth and altitude, the star on the celestial sphere may be selected by the use of the ascertained information, as by using an astro-compass for the azimuthal determination and a sextant for the altitudinal determination. Alternatively, rough visual estimates of azimuth or altitude on the celestial sphere may be made, or the difference in azimuth and altitude of the star being located from the azimuth and altitude of any known star on the celestial sphere may be ascertained by reference to the instrument, and by employing the ascertained differences, the star being located may be selected.

Any particular template for use in the southern hemisphere will be like the template for use in the corresponding latitude band of the northern hemisphere, except the slot therein for insertion under the cursor arm will run along the 180 degree azimuth line, with the 190 degree, 200 degree, etc., azimuth lines positioned clockwise of the slot.

The use of the instrument of this invention for ascertaining the correction to be applied to the observed altitude of Polaris to determine the latitude of the observer is extremely simple. Having oriented the instrument according to B or C above, it is merely necessary to ascertain the point of intersection along the Polaris correction scale 66 or 68 on the meridian disc 14 and a radial line drawn from the center of the instrument to the short Polaris radial line near the periphery of the base disc 10. This may be readily accomplished by holding the meridian disc 14 fast relative to the base disc 10 by means of the cursor arm 18, and then rotating the measuring disc 12 until the green radial line 62 thereon points directly to the short Polaris radial line near the periphery of the base disc 10. The value on scale 66 or 68 indicated by line 62 may then be read, and in the instance of the values used in settings B and C above will be found to be plus 57½ minutes. This value agrees with the correction given by the Air Almanac for a Local Hour Angle of 195 degrees.

It will be appreciated that the Polaris correction depends only on the LHAT, and that for the following Local Hour Angles of Aries the following corrections are applicable:

| LHAT | Correction |
| --- | --- |
| 116°30' | 0 |
| 206° | +59' |
| 296°30' | 0 |
| 26° | −59' |

For intermediate Local Hour Angles of Aries between any two of the above Local Hour Angles of Aries, the algebraic sign of the correction is indicated by the sign of the maximum correction applicable at the two selected points, and the magnitude of the correction gradually changes with a change in LHAT between the two points. The meridian scale 14 is graduated to give the stated corrections at the four given basic points, and to give corrections of proper intermediate values for intermediate Local Hour Angles of Aries.

To give the observer a graphic representation of the concept of Local Hour Angle of Aries or Local Hour Angle of any star or planet, any one of the settings A, B or C may be used, and in the event it is desired to measure the LHA, setting B or C should be used. In the case where the observer must ascertain the Local Hour Angle of Aries or of some celestial body, after setting B or C has been accomplished, the cursor arm 18 is secured against the base disc 10 by applying slight pressure, and the measuring disc 12 is rotated so that the zero graduations thereon are at the outer end of the observer's meridian line 64. The Greenwich meridian line 62 will also be under the meridian line 64. The Local Hour Angle, east or west up to 180 degrees for use with H. O. 214 tables, and the Local Hour Angle, west only up to 360 degrees for use with H. O. 218 tables, of Aries or of any star may be easily read by the inner scale 60 or outer scale 58 on the measuring disc 12. The angle in question is, of course, the angle between the observer's meridian line 64 and the radial line on the periphery of the base disc 10 representative of the Sidereal Hour Angle of Aries or the celestial body in question.

In the case where the observer desires to know the Local Hour Angle of the sun, moon or other planet, the red radial line 50 on the base disc may be employed to represent the meridian of the sun, moon or other planet in question. The Greenwich Hour Angle of the planet in question for the day, hour and minute may be found from the Air Almanac or equivalent source, and by means of the measuring scale 12 the Greenwich meridian line 62 thereon may be displaced from the red line 50 according to the Greenwich Hour Angle of the body. The meridian disc 14 may then be rotated relative to the measuring disc 12 so that the black observer's meridian line 64 is positioned relative to the inner scale 60 on the measuring disc 12 according to the longitude of the observer, care being taken to use the east or west scale according to whether the observer's longitude is east or west. By these adjustments, the black observer's meridian line 64 is angularly positioned relative to the red line 50 on the base disc 10 according to the local hour angle of the planet in question, and the local hour angle of the planet may be measured by means of the measuring disc 12.

In view of the preceding discussion it will be appreciated that by means of the instrument of this invention the Local Hour Angle of any star or planet may be quickly and accurately ascertained without the necessity of any mathematical calculations. For accuracy to within one degree, by means of the instrument the local hour angle of any star may be ascertained; for accuracy to within one-quarter of a degree a single reference to the Air Almanac is necessary to obtain the GHAT, and then the Local Hour Angle of any star or planet may be found by means of the instrument within the stated accuracy. Those skilled in the art will appreciate the great value of the instrument for giving a graphic representation of the concepts which determine the Local Hour Angle of a star or planet, as well as the great advantages of my instrument which makes it possible to ascertain the Local Hour Angle of any star or planet without resorting to the time-consuming and error-provoking mathematical calculations which must be made when my instrument is not used. When greater accuracy in the computation of the Local Hour Angle of a star or planet is required than can be accomplished by means of my instrument, the instrument may be used to check the value found by mathematical calculation to be certain that error has not been made.

My instrument may also be employed to ascertain the time of transit of Aries or any celestial body over the meridian of the observer on any given day. This information is frequently important to the navigator who may desire to take observations upon a given celestial body at the time it is over his meridian in order to find his latitude. The orientation of the instrument to find the time of transit is the reverse from the procedure heretofore described for orienting the instrument to find the Local Hour Angle of any body.

For example, if it is desired to find the time of transit of Aries, Spica and Antares on June 15, using Zone time:

1—The meridian disc 14 is rotated so that the observer's meridian line 64 coincides with the Aries meridian line 50 on the base disc 10, or with the short radial line of Spica or Antares near the periphery of the base disc 10, as the case may be.

2—The clock disc 16 is rotated so that the black pointer 74 is opposite June 15.

3—The time of transit of Aries or the body in question is the time indicated by the red arrow 54 on the base disc 10 relative to the clock scale 72.

In the illustrated cases the time of transit of Aries will be found to be 0627, of Spica 1951, and of Antares 2256. Virtually identical results may be obtained by reference to the Air Almanac, but the latter method will require more time.

The above method is subject to error proportional to the distance of the observer from the mid-meridian of his time zone, so for a more accurate determination of the time of transit, Local Civil time is used by introducing a conversion from the mid-meridian of the time zone to the local meridian of the observer. In the event the observer is at 54°30′ west longitude, the following procedure is adopted:

Steps 1 and 2 above are accomplished.

3. Holding the cursor arm 18 fast against the base disc 10 to prevent relative rotation between the base disc 10, meridian disc 14, and clock disc 16, the measuring disc 12 is rotated so that the outer end of the observer's meridian line 64 indicates a west longitude of 54°30′ on the measuring disc.

4. Holding the measuring disc 12 against rotation relative to the base disc 10, the meridian disc 14 and clock disc 16 are rotated by means of the cursor arm 18 so that the observer's meridian line 64 indicates a longitude of 60 degrees (the mid-meridian longitude of the time zone) relative to the measuring disc 12.

5. The time of transit is read by noting the position of the red arrow 54 relative to the clock disc 16.

In view of the above it is believed unnecessary to set forth in general terms the five steps which must be taken by the observer to ascertain the time of transit of any celestial body over the observer's meridian.

The instrument disclosed herein may also be used to convert Zone time to Local Civil time or Local Sidereal time to an accuracy of within one or two minutes. To give a specific example, suppose that at 1930 Zone time on June 15 it is desired to find the Local Civil time and Local Sidereal time at longitude 65°30′ W. The following steps are taken:

1—The pointer 74 on the clock disc 16 is set relative to the calendar scale 70 on the meridian disc 14 for the day of the year, viz., June 15.

2—By means of the cursor arm 18 the meridian disc 14 and clock disc 16 are rotated relative to the base disc 10 until the red pointer 54 on the base disc 10 indicates the Zone time on the clock disc 16, viz., 1930 o'clock.

3—The cursor arm 18 is held to prevent relative rotation between the base disc 10, the meridian disc 14, and clock disc 16, and the measuring disc 12 is rotated until the observer's meridian line 64 on the meridian disc 14 indicates the longitude of the mid-meridian of the time zone of the observer relative to the measuring disc 12, viz., 60° W.

4. Holding the measuring disc 12 against the base disc to prevent relative rotation, the meridian disc 14 and clock disc 16 are rotated by the cursor arm relative to the other two discs until the observer's meridian line 64 indicates the observer's longitude on the measuring disc 12, viz., 65°30'.

The Local Civil time may be noted by observing the position of the red pointer 54 on the base disc 10 relative to the clock scale—in the illustrated case about 1908.

To obtain the Local Sidereal time, the following additional step is necessary:

5—Holding the cursor arm 18 against movement, the clock disc 16 is rotated until the arrow 74 thereon is aligned with the observer's meridian line 64.

The Local Sidereal time, or the number of hours and minutes that have elapsed since Aries passed over the local meridian of the observer, is indicated by the position of the clock disc 16 relative to the red arrow 54 on the base disc 10—in the instant case, 1235.

The instrument of this invention may also be used to convert arc to time, to convert Local Civil time to Greenwich Civil time, and vice versa. To find the difference in time between the observer's meridian and the meridian of Greenwich, 1—The observer's meridian line 64 on the disc 14 is set relative to the measuring disc 12 to indicate the observer's longitude, e. g., 60 degrees.

2—The angular difference between the observer's meridian line 64 and the Greenwich meridian line 62 on the measuring disc 12 in terms of hours and minutes of time may be ascertained by placing the pointer 74 on the line 64 or 62, depending on which position will enable measurement of the smallest angle between the two meridian lines in the clockwise direction. The extent to which the Local Civil time is ahead or behind the Greenwich Civil time will be indicated by the position of the clock disc 16 relative to the other meridian line, in the case being discussed, 4 hours. For an observer in an east longitude, his time is ahead of Greenwich time, while the opposite is true of an observer in a west longitude.

To convert Greenwich Civil time to Local Civil time, step 1 above is accomplished, and 2. The Greenwich Civil time on the clock disc 16 is set against the observer's meridian line 64, and the Local Civil time may be read by noting the position of the clock disc 16 relative to the Greenwich meridian line 62 on the measuring disc 12.

To convert Local Civil time to Greenwich Civil time, step 1 above is accomplished, and 2. The Local Civil time is set against the Greenwich meridian 62 and the Greenwich Civil time is indicated by the position of the observer's meridian 64 relative to the clock disc 16.

Reference is now made to Fig. 4 which discloses the declination scale 46 which may be used for plotting additional celestial bodies, particularly planets, on the bottom of the base disc 10. For the purpose of plotting additional planets, the following procedure may be followed:

1. From the Air Almanac or similar source, the time of day when the Greenwich meridian coincides with the Aries meridian is noted, as are the Greenwich Hour Angles of the planets at that particular time.

2. The instrument is adjusted so that the Greenwich meridian 62 is directly over the Aries meridian 50.

3. Securing the measuring disc 12 to the base disc 10 to prevent relative rotation therebetween, the outer edge of the base disc 10 is marked at the proper points for the Greenwich Hour Angle of each planet as found in 1 above.

4. The cursor arm 18 is then rotated so that the observer's meridian line 64 successively points to the marks placed on the edge of the base disc 10, and the declination scale 46 is placed in position along the under side of the base disc 10 with the center pin 75 of the instrument inside the hook 48 and the upper straight edge of the scale bearing against the rib 18g on the top of the lower cursor arm 18a. The planet is then plotted along the edge of the declination scale at the proper declination. The representations of the planets thus plotted in may be used as previously explained in locating the same in the sky, or in identifying the same when their azimuths and altitudes are known.

In view of the preceding disclosure it will be appreciated that the novel instrument of this application is simple in construction and is of the type that one can readily become skilled in the use of the same. The various parts of the instrument may be easily and accurately oriented according to the time of day, date and longitude of the observer, and having been so oriented, the instrument may be used as a star finder or to learn the identity of any particular star whose altitude and azimuth are known. By use of the instrument, Polaris corrections may be quickly and accurately determined, and the instrument is useable to graphically illustrate the factors which determine the Local Hour Angle of any celestial body, and the instrument may also be used to determine, without the necessity of any mathematical computations, the Local Hour Angle of any celestial body. The time of transit of Aries or any other body over the local meridian of the observer may be readily ascertained, and the conversion of Zone time into Local Civil time or Local Sidereal time may also be accomplished by the use of my instrument. The same is true of the conversion of arc to time, the conversion of Local Civil time to Greenwich Civil time, and vice versa. In view of the numerous illustrated uses of my instrument, it will be appreciated that it is of general use to the celestial navigator.

It will be appreciated that my instrument contains several novel arrangements or combinations, any one of which by itself may be incorporated in an instrument of the general class to which this invention relates. It will be appreciated that the substance of my invention may be incorporated in an instrument for use in the south terrestrial hemisphere, or alternatively in a single instrument for use in both hemispheres. Also, many changes may be made from the disclosed preferred embodiment of my invention without departing from the substance thereof. All such novel arrangements and changes are intended to be covered by the following claims.

I claim:

1. An instrument of the character described comprising a plurality of concentrically mounted discs each rotatable relative to the others, an annular scale of hours and minutes of the day on the first of said discs, an annular scale of months and days of the year on the second of said discs and arranged for cooperation with the scale on said first disc, said second disc being on the same side of the third of said discs as the first disc, an index mark on the same side of said third disc as said first two discs for use in orienting said first two discs relative to said third disc, and a star chart on the reverse side of said third disc, said star chart comprising a plurality of star representations each angularly displaced from the said index mark according to the right ascension of the star represented thereby and each displaced from the center of the disc according to the declination of the star represented thereby.

2. An instrument of the character described comprising a plurality of concentrically mounted discs each rotatable relative to the others, an annular scale of hours and minutes of the day on the first of said discs, an annular scale of months and days of the year on the second of said discs and arranged for cooperation with the scale on said first disc, said second disc being on the same side of the third of said discs as the first disc, an index mark on the same side of said third disc as said first two discs for use in orienting said first two discs relative to said third disc, a star chart on the reverse side of said third disc, said star chart comprising a plurality of star representations each angularly displaced from the said index mark according to the right ascension of the star represented thereby and each displaced from the center of the disc according to the declination of the star represented thereby, and a radially extending arm having one end pivoted at the center of said third disc on the same side thereof as said star chart, said arm extending beyond the periphery of said disc and back over the top side of the third disc, the other end of said arm being affixed to said second disc.

3. An instrument of the character described comprising a plurality of concentrically mounted discs each rotatable relative to the others, an annular scale of hours and minutes of the day on the first of said discs, an annular scale of months and days of the year on the second of said discs and arranged for cooperation with the scale on said first disc, said second disc being on the same side of the third one of discs as the first disc, an index mark on the same side of said third disc as said first two discs for use in orienting said first two discs relative to said third disc, a star chart on the reverse side of said third disc, said star chart comprising a plurality of star representations each angularly displaced from the said index mark according to the right ascension of the star represented thereby and each displaced from the center of the disc according to the declination of the star represented thereby, a radially extending arm having one end pivoted at the center of said third disc on the same side thereof as said star chart, said arm extending beyond the periphery of said disc and back over the top side of the third disc, the other end of said arm being affixed to said second disc, said arm having a relatively thin rib extending lengthwise thereof and located on the surface of said arm adjacent the side of said third disc carrying said star chart.

4. An instrument of the character described comprising at least three concentrically mounted discs each rotatable relative to the others, an index mark on the third disc representative of the meridian of Aries, scale means on the first and second discs for orienting the second disc relative to the third disc according to the Local Hour Angle of Aries of the observer, said first and second discs both being on the same side of said third disc, a star chart on the reverse side of said third disc, said star chart comprising a plurality of star representations each angularly displaced from the Aries index mark according to the right ascension of the star represented thereby and each displaced from the center of the disc according to the declination of the star represented thereby, and a radially extending arm having one end pivoted at the center of said third disc on the same side thereof as said star chart, said arm extending beyond the periphery of said disc and back over the top side of the third disc, the other end of said arm being affixed to said second disc.

5. An instrument of the character described comprising at least three concentrically mounted discs each rotatable relative to the others, an index mark on the third disc representative of the meridian of Aries, scale means on the first and second discs for orienting the second disc relative to the third disc according to the Local Hour Angle of Aries of the observer, said first and second discs both being on the same side of said third disc, a star chart on the reverse side of said third disc, said star chart comprising a plurality of star representations each angularly displaced from the Aries index mark according to the right ascension of the star represented thereby and each displaced from the center of the disc according to the declination of the star represented thereby, a radially extending arm having one end pivoted at the center of said star chart, said arm extending beyond the periphery of said disc and back over the top side of the third disc, the other end of said arm being affixed to said second disc, said arm having a relatively thin rib extending lengthwise thereof and located on the surface of said arm adjacent the side of said third disc carrying said star chart.

6. An instrument of the character described comprising at least three concentrically mounted discs each rotatable relative to the others, an index mark on the third disc representative of the meridian of Aries, scale means on the first and second discs for orienting the second disc relative to the third disc according to the Local Hour Angle of Aries of the observer, said first and second discs both being on the same side of said third disc, a star chart on the reverse side of said third disc, said star chart comprising a plurality of star representations each angularly displaced from the Aries index mark according to the right ascension of the star represented thereby and each displaced from the center of the disc according to the declination of the star represented thereby, a radially extending arm having one end pivoted at the center of said third disc on the same side thereof as said star chart, said arm extending beyond the periphery of said disc and back over the top side of the third disc, the other end of said arm being affixed to said second disc, and a template having marked thereon curves of equal altitude and lines of equal azimuth for the particular latitude of use thereof for use in conjunction with the said star chart, said template having a radially extending slot for orienting said template relative to said star chart according to the position of said arm relative to said star chart by engaging said arm in said slot, and index means on said template for positioning said template radially of said arm according to the latitude of the observer.

7. An instrument of the character described comprising a plurality of concentrically mounted discs each rotatable relative to the others, an annular scale of hours and minutes of the day on the first of said discs, an annular scale of months and days of the year on the second of said discs and arranged for cooperation with the scale on said first disc, an index representative of the observer's meridian positioned on said second disc on a theoretical line passing from the center of the disc through the September 22 graduation thereon, and an index on the third of said discs representative of the meridian of Aries.

8. An instrument of the character described comprising a plurality of concentrically mounted discs each rotatable relative to the others, an annular scale of hours and minutes of the day on the first of said discs, an annular scale of months and days of the year on the second of said discs and arranged for cooperation with the scale on said first disc, an index representative of the observer's meridian positioned on said second disc on a theoretical line passing from the center of the disc through the September 22 graduation thereon, an index on the third of said discs representative of the meridian of Aries, and a plurality of index marks and associated star names angularly positioned around the center of said third disc according to the sidereal hour angle of the stars represented thereby.

9. An instrument of the character described comprising a plurality of concentrically mounted discs each rotatable relative to the others, an annular scale of hours and minutes of the day on the first of said discs, an annular scale of months and days of the year on the second of said discs and arranged for cooperation with the scale on said first disc, an index representative of the observer's meridian positioned on said second disc on a theoretical line passing from the center of the disc through the September 22 graduation thereon, an annular scale of degrees on the third of said discs arranged for cooperation with the observer's meridian index, and an index on the fourth of said discs representative of the meridian of Aries.

10. An instrument of the character described comprising a plurality of concentrically mounted discs each rotatable relative to the others, an annular scale of hours and minutes of the day on the first of said discs, an annular scale of months and days of the year on the second of said discs and arranged for cooperation with the scale on said first disc, an index representative of the observer's meridian positioned on said second disc on a theoretical line passing from the center of the disc through the September 22 graduation thereon, an annular scale of degrees on the third of said discs arranged for cooperation with the observer's meridian index, an index on the fourth of said discs representative of the meridian of Aries, and a plurality of index marks and associated star names angularly positioned around the center of said fourth disc according to the sidereal hour angle of the stars represented thereby.

11. An instrument of the character described comprising a base disc having an index mark representative of the meridian of Aries and an index mark representative of the meridian of Polaris angularly displaced from the first index mark according to the sidereal hour angle of Polaris, a second disc concentric with said first disc and having thereon an index mark representative of the meridian of the observer, and a Polaris correction scale on said second disc, said scale being arranged to indicate the correction applicable to the observed altitude of Polaris to give the latitude of the observer when the observer's meridian index is angularly positioned relative to the Aries meridian index according to the Local Hour Angle of Aries of the observer by noting the point of crossing of the Polaris correction scale and a line passing through the center of the instrument and the Polaris index mark.

12. An instrument of the character described comprising a base disc having an index mark representative of the meridian of Aries and an index mark representative of the meridian of Polaris angularly displaced from the first index mark according to the sidereal hour angle of Polaris, a second disc concentric with the base disc and having an annular scale graduated in degrees from 0 to 360, a third disc concentric with said first two discs and having thereon an index mark representative of the meridian of the observer, and a Polaris correction scale on said third disc, said scale being arranged to indicate the correction applicable to the observed altitude of Polaris to give the latitude of the observer when the observer's meridian index is angularly positioned relative to the Aries meridian index according to the Local Hour Angle of Aries of the observer by noting the point of crossing of the Polaris correction scale and a line passing through the center of the instrument and the Polaris index mark.

13. An instrument of the character described comprising a plurality of concentrically and adjacently mounted discs including a base disc, a measuring disc, a calendar disc and a clock disc, each of said discs being of substantially lesser radius than the preceding mentioned disc, graduations on each of said discs for use in orienting said discs relative to one another according to the time of day, day of the year and longitude of the observer, and a cursor arm for use in selectively orienting said discs relative to one another, said cursor arm comprising a lower arm pivoted concentrically with said discs on the under side of said base disc and an upper arm affixed to the calendar disc, said arms being connected at their outer ends to form a unitary structure.

14. An instrument of the character described comprising a plurality of concentrically and adjacently mounted discs including a base disc, a measuring disc, a calendar disc and a clock disc, each of said discs being of substantially lesser radius than the preceding mentioned disc, graduations on each of said discs for use in orienting said discs relative to one another according to the time of day, day of the year and longitude of the observer, and a cursor arm for use in selectively orienting said discs relative to one another, said cursor arm comprising a lower arm pivoted concentrically with said discs on the under side of said base disc and an upper arm affixed to the calendar disc and having its inner end overlie the outer edge of said clock disc, said arms being connected at their outer ends to form a unitary structure.

15. An instrument of the character described comprising a base disc having an index mark representative of the meridian of Aries and an index mark representative of the meridian of Polaris angularly displaced from the first index mark according to the sidereal hour angle of Polaris, a second disc concentric with the base disc and having an annular scale graduated in degrees from 0 to 360, a third disc concentric with said first two discs and having thereon an index mark representative of the meridian of an observer and an annular scale of months and days of the year, a fourth disc concentric with said other discs having an annular scale of hours and minutes of the day arranged for cooperation with said scale of months and days of the year, and a Polaris correction scale on said third disc, said scale being arranged to indicate the correction applicable to the observed altitude of Polaris to give the latitude of the observer when the observer's meridian index is angularly positioned relative to the Aries meridian index according to the Local Hour Angle of Aries of the observer by noting the point of crossing of the Polaris correction scale and a line passing through the center of the instrument and the Polaris index mark.

16. An instrument of the character described comprising a plurality of concentrically mounted discs each rotatable relative to the others, a radial line on the first of said discs representative of the meridian of Aries, annular graduations from 0 through 360 on the second of said discs and a radial line passing through the 0 graduation thereof, an annular scale of months and days of the year on the third of said discs, and a radial line representative of the observer's meridian on said third disc passing through the September 22 graduation thereon.

17. An instrument of the character described comprising a plurality of concentrically mounted discs each rotatable relative to the others, a radial line on the first of said discs representative of the meridian of Aries, annular graduations from 0 through 360 on the second of said discs and a radial line passing through the 0 graduation thereof, an annular scale of months and days of the year on the third of said discs, a radial line representative of the observer's meridian on said third disc passing through the September 22 graduation thereon, and an annular scale of hours and minutes of the day on the fourth of said discs.

HENRY WILSON YOUNG.

REFERENCES CITED

The following references are of record in the file of this patent:

UNITED STATES PATENTS

| Number | Name | Date |
| --- | --- | --- |
| 1,401,446 | Rude | Dec. 27, 1921 |
| 2,418,933 | Hill | Apr. 15, 1947 |